United States Patent
Goodrich et al.

(10) Patent No.: US 11,854,714 B2
(45) Date of Patent: Dec. 26, 2023

(54) HIGH THROUGHPUT CONTINUOUS PROCESSING OF ALUMINUM ALLOYS FOR ELECTRICAL INTERCONNECT COMPONENTS

(71) Applicant: Materion Corporation, Mayfield Heights, OH (US)

(72) Inventors: Trevor L Goodrich, Natick, MA (US); Aaron M. Vodnick, East Greenwich, RI (US); Robert P. Willis, Lincoln, RI (US); Joseph G. Kaiser, Barrington, RI (US)

(73) Assignee: Materion Corporation, Mayfield Heights, OH (US)

( * ) Notice: Subject to any disclaimer, the term of this patent is extended or adjusted under 35 U.S.C. 154(b) by 1341 days.

(21) Appl. No.: 15/417,551

(22) Filed: Jan. 27, 2017

(65) Prior Publication Data
US 2017/0221598 A1  Aug. 3, 2017

Related U.S. Application Data

(60) Provisional application No. 62/288,207, filed on Jan. 28, 2016.

(51) Int. Cl.
*H01B 1/02* (2006.01)
*C22F 1/04* (2006.01)
*B23K 101/38* (2006.01)

(52) U.S. Cl.
CPC .............. *H01B 1/023* (2013.01); *C22F 1/04* (2013.01); *B23K 2101/38* (2018.08)

(58) Field of Classification Search
CPC .... C22F 1/00; C22F 1/05; C22F 1/053; C22F 1/057; H01B 1/023; B23K 2101/38; C25D 5/44
See application file for complete search history.

(56) References Cited

U.S. PATENT DOCUMENTS 4,430,166 A * 2/1984 Carter .................. C25D 7/0614
                                                    204/206
5,362,341 A * 11/1994 Palmer ..................... C22F 1/047
                                                    148/692
(Continued)

OTHER PUBLICATIONS

Shen, Yuan-Shou, "Electrical Contact Materials", ASM Handbook vol. 2: Properties and Selection: Nonferrous Alloys and Special-Purpose Materials, pp. 840-868. (Year: 1990).*
(Continued)

*Primary Examiner* — George Wyszomierski
*Assistant Examiner* — Janell C Morillo
(74) *Attorney, Agent, or Firm* — COZEN O'CONNOR

(57) ABSTRACT

A tempering process for tempering an aluminum alloy coil includes a first reel-to-reel process including an anneal to solutionize the aluminum alloy followed by a quench, a second reel-to-reel process comprising rolling reduction, and a hardening anneal performed on the aluminum alloy coil. Cladding may be performed during the second reel-to-reel process; or a subsequent reel-to-reel electroplating process may be performed including an alkaline soak clean, an alkaline microetch and seed electroplating, and aqueous electroplating of a contact metal onto the seed electroplating. Electrical interconnect components may be stamped from the tempered and clad or electroplated aluminum alloy coil. The electrical interconnect components may, for example, be connectors, lead frames, or bus bars.

11 Claims, 8 Drawing Sheets

(56) References Cited

U.S. PATENT DOCUMENTS

| | | | | |
|---|---|---|---|---|
| 5,525,169 | A | * | 6/1996 | Murtha .................. C22C 21/02 |
| | | | | 148/695 |
| 9,938,612 | B2 | * | 4/2018 | De Smet ................. C22C 21/04 |
| 2008/0057799 | A1 | * | 3/2008 | Pereira ................. B23K 1/0008 |
| | | | | 439/876 |
| 2011/0132659 | A1 | * | 6/2011 | Kusakari ................ C22C 21/00 |
| | | | | 174/72 A |

OTHER PUBLICATIONS

Sverdlin, Alexey, "Types of Heat Treating Furnances", ASM Handbook vol. 4B, pp. 83-107. (Year: 2014).*
Cotell, C.M. et al., "Surface Engineering of ALuminum and ALuminum Alloys", ASM Handbook vol. 5, pp. 784-804. (Year: 1994).*

* cited by examiner

Comparison of disclosed process ("MTM") with 6061 T6 Al tempering ("Standard")

| Process | Standard | | | | MTM | | | |
|---|---|---|---|---|---|---|---|---|
| | Process | Type | Cond. | Time | Process | Type | Cond. | Time |
| Solutionize | 1 | Batch | 990 F | Mass dependent | 1 | Reel to reel | 990-1060 F | 4-15 min |
| Quench | 2 | Batch | Water | N/A | 1 | Reel to reel | Air | 4-15 min |
| Cold work | | | None | | 2 | Reel to reel | 20% - 80% reduction | |
| Precipitation harden | 3 | Batch | 320 F | 18 hours | 3 | Batch | 325 F | 16 hours |
| Artificially age | 4 | Batch | 350 F | 8 hours | | | | |

Notes:
MTM solutionize and quench steps are run in a continuous reel to reel process; time is adjusted by line speed
MTM solutionize and quench steps are run under H2 blanket (>20% v/v)
The MTM air quench is cooled by a water jacket

Fig. 3

Comparison of disclosed (MTM) high strength Al with standard high strength Al alloys

| 6061 | -T4 | -T6 | -MTM |
|---|---|---|---|
| Tensile Strength | >30 ksi | >42 ksi | >42 ksi |
| Yield Strength | >16 ksi | >35 ksi | >35 ksi |
| Elongation | >10% | >4% | >4% |

Fig. 4

Continuous Reel to Reel Plating

Precious Metal Option

| Chemistry | Alkaline soak clean | Rinse | Alkaline microetch | Rinse | Zincate | Rinse | Ni-1 | |
|---|---|---|---|---|---|---|---|---|
| | 1 S21 | 2 | 3 S22 | 4 | 5 S23 | 6 | 7 | → A |
| Type | flood | flood | flood | flood | flood | flood | flood | |

Non-Precious Metal Option

| Chemistry | Alkaline soak clean | Rinse | Alkaline microetch | Rinse | Zincate | Rinse | Ni-1 or Sn-1 | |
|---|---|---|---|---|---|---|---|---|
| | 1 S21 | 2 | 3 S22 | 4 | 5 S23 | 6 | 7 | → B |
| Type | flood | flood | flood | flood | flood | flood | flood | |

Fig. 5A

HIGH THROUGHPUT CONTINUOUS PROCESSING OF ALUMINUM ALLOYS FOR ELECTRICAL INTERCONNECT COMPONENTS

This application claims the benefit of U.S. Provisional Application No. 62/288,207 filed Jan. 28, 2016 and titled "HIGH THROUGHPUT CONTINUOUS PROCESSING OF ALUMINUM ALLOYS FOR ELECTRICAL INTERCONNECT COMPONENTS". U.S. Provisional Application No. 62/288,207 filed Jan. 28, 2016 and titled "HIGH THROUGHPUT CONTINUOUS PROCESSING OF ALUMINUM ALLOYS FOR ELECTRICAL INTERCONNECT COMPONENTS" is hereby incorporated by reference in its entirety into the specification of this application.

BACKGROUND

The following relates to the metallurgy arts, cladding arts, electroplating arts, electrical interconnect component manufacturing arts, electrical interconnect component arts, and related arts.

Electrical interconnect components provide the physical electrically conductive pathways between two or more devices or components of electrical systems. Electrical interconnect components include, by way of illustration, separable connectors, terminals and switches, lead frames for semiconductor packaging, and bus bars for assembling battery packs.

Most electrical interconnect components include a base metal (i.e. substrate) to give the component electrical conductivity and mechanical robustness. Most commonly, the base metal is a copper alloy, nickel alloy or iron base alloy. These base metals can be processed in large coils, in a continuous reel-to-reel process with electroplated and/or inlay clad contact surfaces that provide functional properties such as low contact resistance, solderability, the ability to wire bond, or enhanced welding performance. Continuous, reel-to-reel processing possible with these base metals enables high throughput and cost efficient manufacturing. However, cost pressures for electronic components has driven the need to find lower cost alternatives to conventional copper, iron and nickel base metals. Additionally, the need for lightweighting in automotive and aerospace applications has also driven the need to work with lower density materials.

Some improvements are disclosed herein to manufacture low cost and lightweight electrical components

BRIEF SUMMARY

In some illustrative embodiments, a method of processing a precipitation hardenable aluminum alloy coil comprises a tempering process that includes: performing a first reel-to-reel process including an anneal to solutionize the aluminum alloy followed by a quench; performing a second reel-to-reel process comprising rolling reduction; and performing a hardening anneal (that is, a precipitation hardening heat treatment) on the aluminum alloy coil. In some embodiments the first solutionizing reel-to-reel process is performed in a strand or tube furnace having a first section heating the aluminum alloy to perform the anneal and a second section including a cooling shroud, forced air, or water bath to perform the quench. In some embodiments the precipitation hardening heat treatment is performed as a batch process on the aluminum alloy coil. In some embodiments cladding is performed during the second reel-to-reel process to clad a contact metal onto the aluminum alloy. In some embodiments the processing of the aluminum alloy coil further comprises performing a reel-to-reel electroplating process on a high strength aluminum alloy coil formed by the tempering process. In some embodiments the reel-to-reel electroplating process is a single reel-to-reel process including: performing an alkaline soak clean to remove organics; performing an alkaline microetch; forming a zinc seed layer by zincation; and performing aqueous electroplating of a contact metal onto the zinc seed layer. In some embodiments the processing of the aluminum alloy coil further comprises stamping electrical interconnect components from the tempered and electroplated aluminum alloy coil. The electrical interconnect components may, for example, be connectors, lead frames, or bus bars.

In some illustrative embodiments, a tempered (that is, precipitation hardened) aluminum alloy coil is disclosed. In some embodiments, the precipitation hardened aluminum alloy coil has tensile strength of at least 42 ksi and yield strength of at least 35 ksi, and may optionally further have maximum elongation of at least 4%. The tempered aluminum alloy coil is precipitation hardened. In some embodiments the precipitation hardened aluminum alloy coil includes a contact metal disposed on one or more surfaces of the hardened aluminum alloy, for example formed by a cladding process or electroplating.

In some illustrative embodiments, an electrical interconnect component comprises: a base metal comprising a precipitation hardened aluminum alloy, the base metal having a shape defining the shape of the electrical interconnect component; and a contact metal disposed on one or more surfaces of the base metal. In some embodiments the base metal has a shape defining an electrical connector, a lead frame, or a bus bar. In some embodiments the base metal has tensile strength of at least 42 ksi and yield strength of at least 35 ksi. In some embodiments the base meal has maximum elongation of at least 4%. In some embodiments the base metal comprises a precipitation hardened aluminum alloy. In some embodiments the contact metal comprises one or more metal layers formed on one or more surfaces of the base metal by a cladding process. In some embodiments the contact metal comprises one or more electroplated metal layers formed on one or more surfaces of the base metal by electroplating.

BRIEF DESCRIPTION OF THE DRAWINGS

FIG. 3 presents parameters for an actually-performed production scale demonstration of the process of FIG. 1, compared with a batch-mode process for producing A96061 high-strength aluminum with equivalent T6 properties.

FIG. 4 compares material properties for the actually-performed laboratory-scale demonstration of FIG. 3 with A96061 high strength aluminum with equivalent T6 properties.

FIGS. 5A and 5B diagrammatically show a reel-to-reel electroplating process performed on high strength aluminum for precious and non-precious metals.

DETAILED DESCRIPTION

Figure 1:
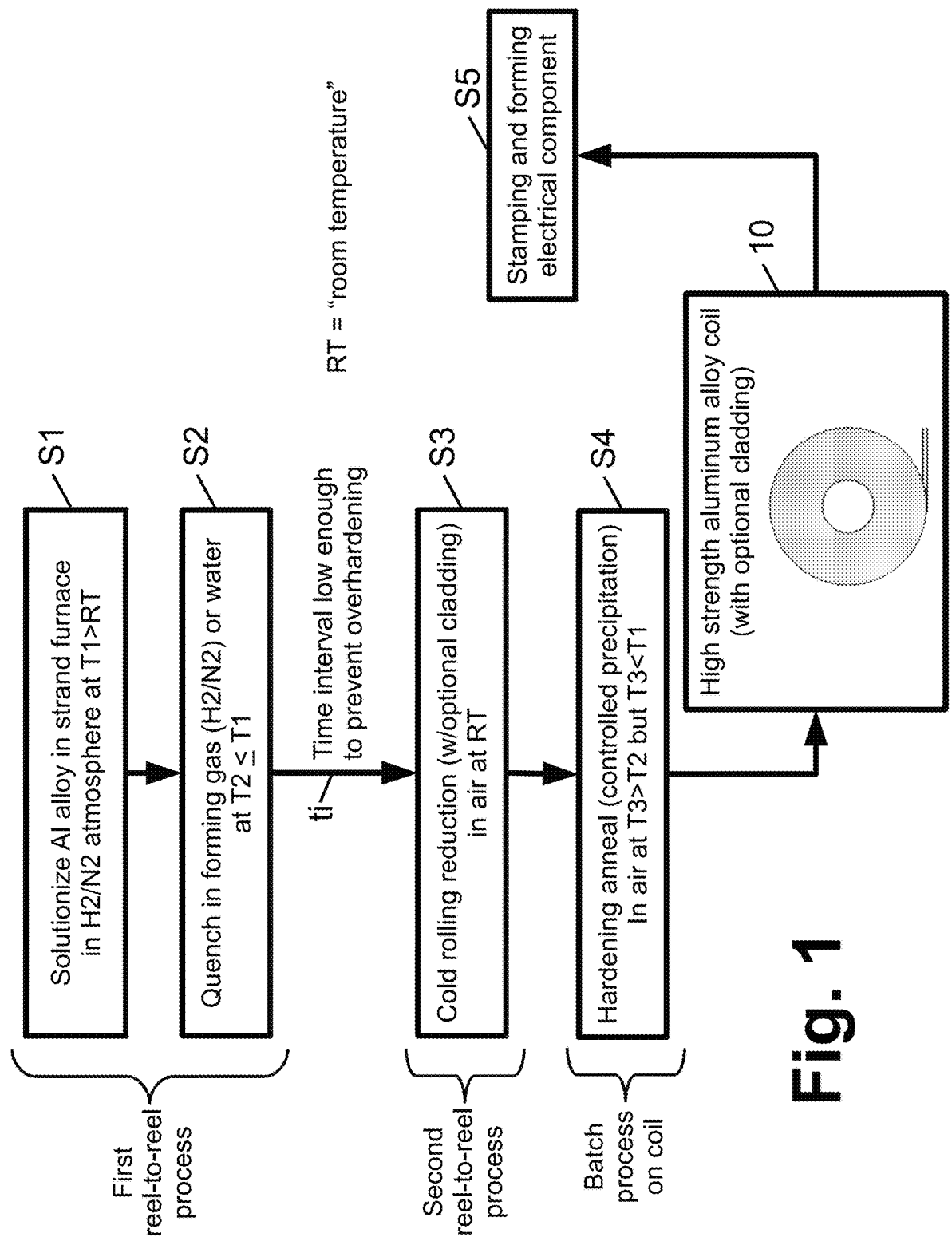
FIG. 1 diagrammatically shows a high-throughput reel-to-reel aluminum coil tempering process to produce a high-strength aluminum coil, optionally with cladding.

Employing a high-strength aluminum alloy as the base metal, such as one of the high strength Al alloys A92024, A96061, or A97075 (where high strength is achieved by precipitation hardening, e.g. using a T6 or other temper), offers significant weight reduction and cost savings over other base metals like copper, nickel or iron based alloys. This is because of the density differences and raw material costs. However, attempting to use such an aluminum base metal in an electrical interconnect component runs up against significant barriers in the manufacturing process.

High strength aluminum needs to have certain mechanical properties in order to be used in electrical interconnect components. These high strength tempers (e.g., T6) are obtained by time consuming batch treatment of the aluminum alloy in accordance with an ASTM standard procedure. Applying such batch processing to an aluminum alloy coil can introduces problems such as difficulties in achieving desired uniformity over the length of the coil and a tendency to "freeze in" the coil shape which can adversely affect forming of the electrical interconnect component shapes. Typically, aluminum distributors do not offer high-strength aluminum tempers in coil form, but rather as loose piece plates, rods, or strips. Fabricating electrical interconnect components from these forms of high strength aluminum alloy stock increases manufacturing complexity and cost as each plate or strip must be loaded in turn into the manufacturing line. Additionally, once the T6 temper is achieved, subsequent processing necessary for cladding or forming is difficult and may result in cracking or damage to the grain structure. The disclosed process enables the integration of the cladding process into the tempering process.

A further difficulty lies in forming the electrical contact surfaces of the electrical interconnect components having a high strength aluminum alloy as the base metal. Electroplating on aluminum alloys is generally performed as a batch process, for example in manufacturing automobile wheels, castings, or so forth, after batch tempering to the T6 temper. Reel-to-reel electroplating on aluminum coils is less common in commercial manufacturing, and in particular is typically not performed on precipitation hardened high strength aluminum (e.g. T6 temper). Electroplating on an aluminum alloy is also typically a slow process and does not lend itself to high throughput. A particular problem is the very strong affinity of oxygen to aluminum, which leads to rapid formation of relatively thick oxidation layers on the surfaces of the aluminum alloy. These oxide layers interfere with the electroplating process, and are removed immediately prior to performing the electroplating.

One common way manufacturers of aluminum components address these problems is to perform the electroplating in a batch mode after cutting out the electrical interconnect components, but again this increases manufacturing cost and complexity. Another alternative approach is to employ roll cladding instead of electroplating, but cladding is difficult to perform in a batch mode, e.g. on high strength aluminum alloy stock in the form of plates or strips, as it requires loading each plate or strip individually into the press rollers assembly and aligning the clad stock. Additionally, aluminum alloys are difficult to vacuum diffusion bond.

Disclosed herein are engineered processes by which a coil of a precipitation hardened aluminum alloy can be manufactured through a continuous, cost effective, reel-to-reel process with the resulting high strength aluminum alloy coil having largely equivalent properties to standard high strength precipitation hardened (e.g. T6 temper) aluminum alloy plates or strips. The foregoing may be combined with reel-to-reel processes by which such high strength aluminum coils can be electroplated (selectively or over entire surfaces) with precious and non-precious metals at high line speeds that facilitate efficient and low cost manufacturing.

In an alternative embodiment, the reel-to-reel electroplating process is replaced by a cladding process that can be performed integrally with a reel-to-reel cold rolling reduction step of the aluminum alloy coil tempering process. This alternative approach eliminates the additional electroplating step. In some embodiments, cladding and electroplating can be used as complimentary processes, whereby the precipitation hardened aluminum strip is first clad and then subsequently electroplated.

Advantageously, by the disclosed manufacturing processes high strength aluminum alloys can be processed in a manner that is analogous to existing copper based reel-to-reel electrical interconnect component manufacturing processes. The disclosed approaches enable coils of aluminum alloy to be treated to the desired temper (i.e. mechanical properties) and then electroplated with a variety of contact finishes, and/or alternatively clad with such finishes during the reel-to-reel tempering process.

Figure 2A:
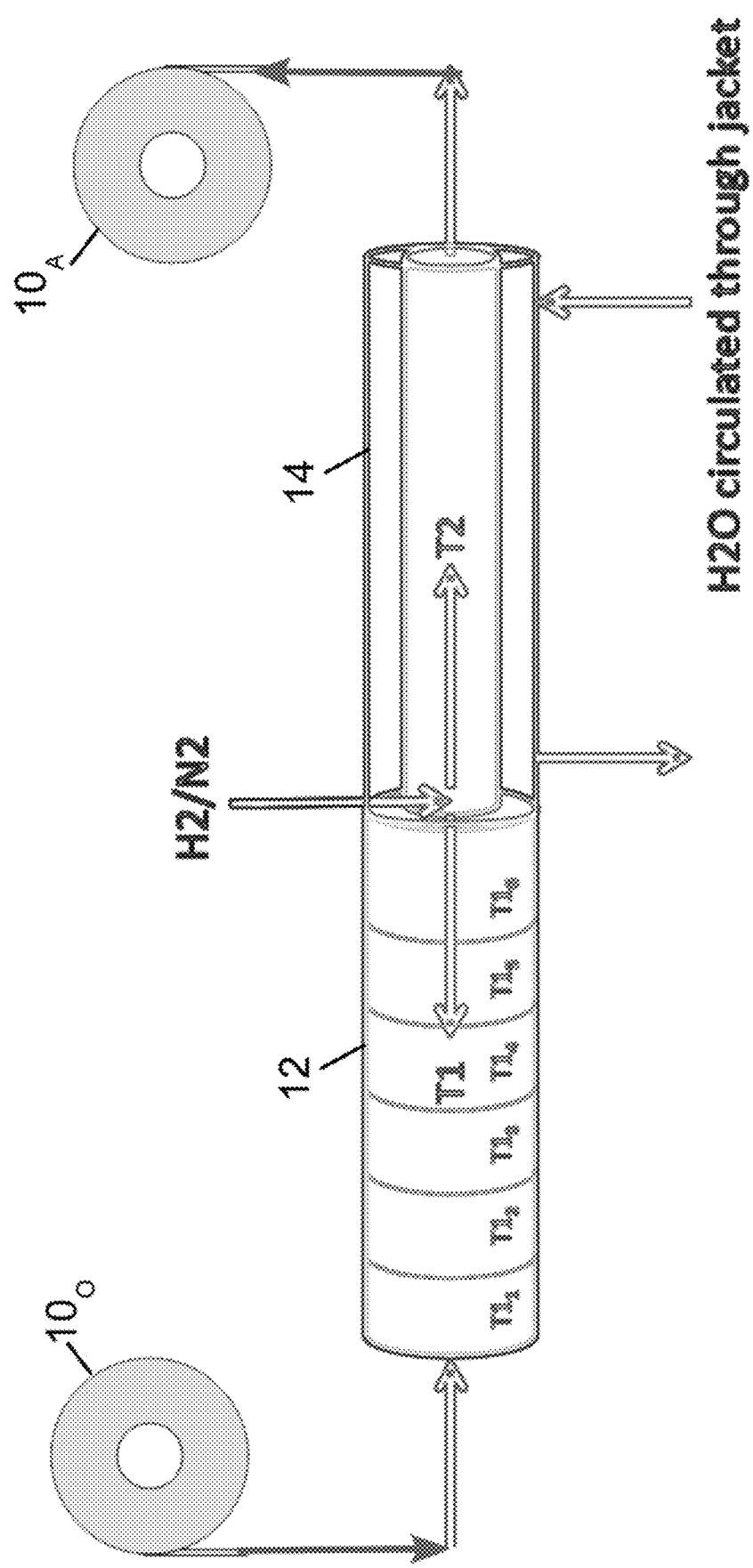
FIGS. 2A, 2B, and 2C show alternative embodiments for performing the tempering process.
Figure 2B:
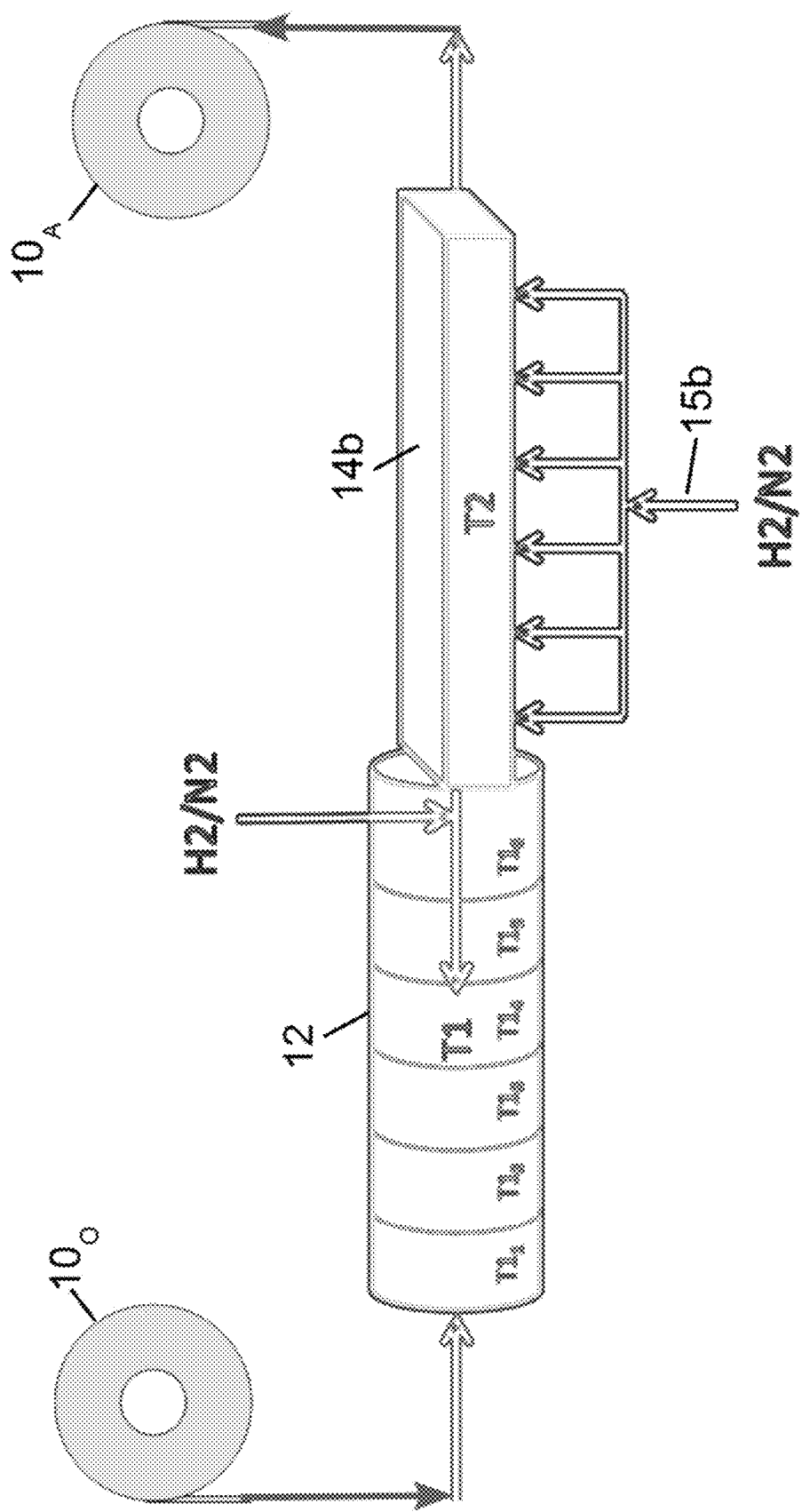
Figure 2C:
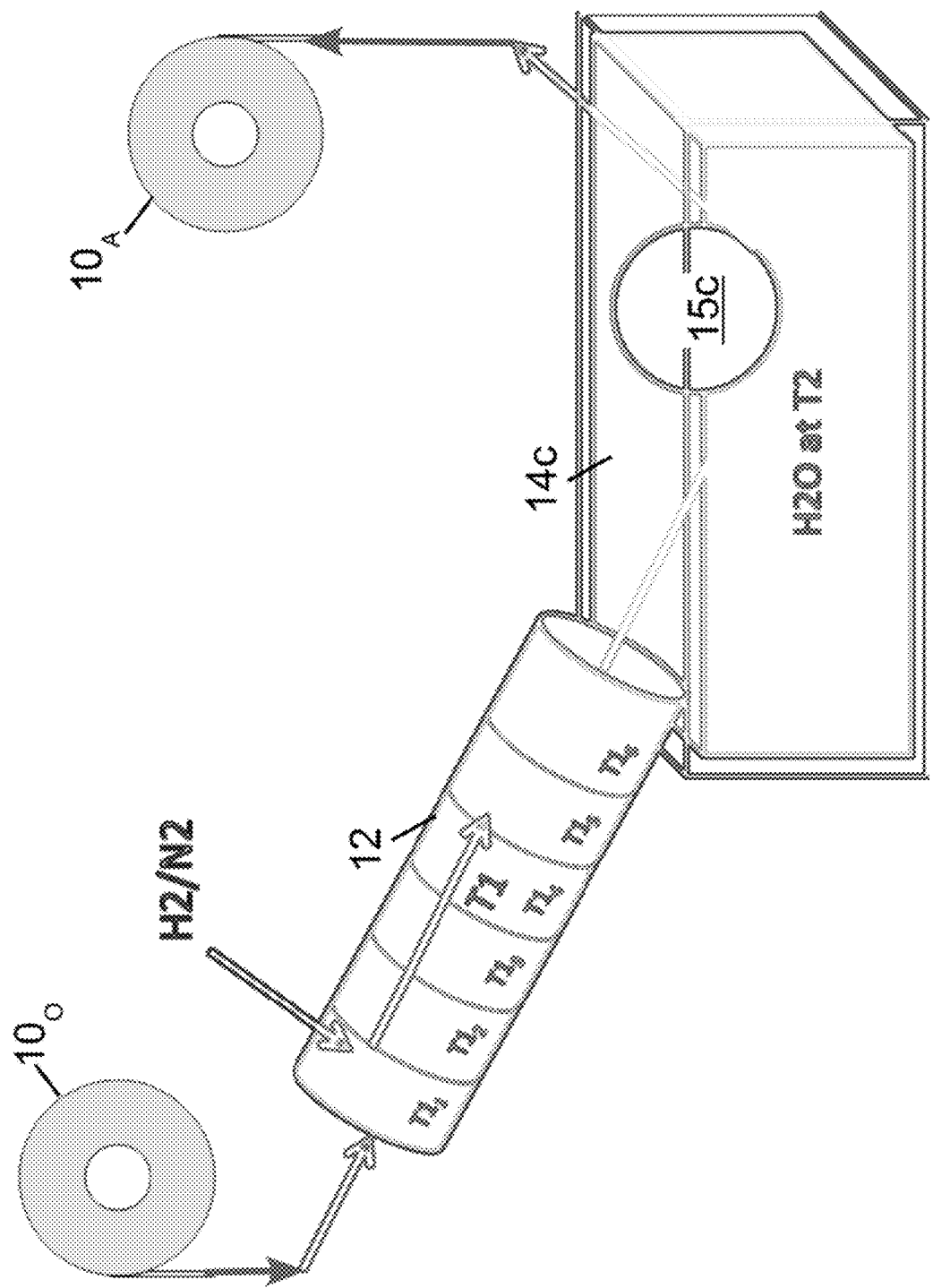

With reference to FIG. 1, a heat treatment process to produce a high strength aluminum alloy coil 10 with a precipitation hardened temper includes several processing steps. The process operates on a precipitation hardenable aluminum alloy coil, such as by way of non-limiting illustration an aluminum alloy coil comprising a 2xxx, 6xxx or 7xxx series aluminum alloy. In a first reel-to-reel process S1, S2, a reel-to-reel strand anneal S1 through a tube furnace is performed to solutionize the alloy (that is, to heat the aluminum alloy at a temperature high enough to form a homogeneous solid solution), followed by a quench S2 at a temperature $T2<T1$ to lock the alloying elements in solution. In an illustrative embodiment (see FIG. 3) using an aluminum 6061 alloy the metal in the hot zone 12 must reach a solutionization temperature, $T_S$, of at least 990° F. It is contemplated that the temperature T1 may be in excess of the solutionization temperature but less than the melting temperature $T_M$ ($T_S<T_1<T_M$) in order to achieve the required heating and cooling rates and minimize time required in the hot zone. For example, in some embodiments the time in the hot zone 12 may be between 20 seconds and 15 minutes dependent on metal thickness and furnace thermal characteristics. Time at temperature can be determined iteratively for those familiar in the art for specific manufacturing equipment or precipitation hardenable aluminum alloys. Optionally, the anneal step S1 can employ two or more independently controlled temperature zones—for example, FIGS. 2A, 2B, and 2C show six such zones operating at respective temperatures $T1_1$, $T1_2$, $T1_3$, $T1_4$, $T1_5$, and $T1_6$. The use of multiple zones is beneficial for providing uniform temperature profiles through the furnace heat zone 12 and can furthermore be used to control heating and cooling rates as the metal strip passes through the hot zone. The quench temperature of quench step S2 is lower than the anneal temperature T1 of anneal step S1 (or, is lower than the zone anneal temperatures $T1_1$, $T1_2$, $T1_3$, $T1_4$, $T1_5$, $T1_6$ if a multiple-zone anneal is employed). For example, in some embodiments the quench temperature T2 is 80° F. or lower. Quenching at or below room temperature (RT) is contemplated. (Room temperature, RT, corresponds to a temperature of about 20-25° C., although slightly higher or lower values for room temperature are contemplated.)

With reference to FIG. 2A, these two steps S1, S2 are suitably performed as a single reel-to-reel process operating on a feed reel carrying the starting aluminum alloy coil 100 (which may, for example, be an A96061-O annealed aluminum alloy coil). An aluminum alloy strip 11 rolled off the feed reel $10_O$ is processed by steps S1, S2 using a strand (or tube) furnace 12 whose initial length is heated to a temperature T1 at which the solutionizing anneal step S1 is performed, and a latter length portion is surrounded by a cooling shroud 14 to perform the quench step S2 at the controlled temperature T2 which is less than the anneal temperature (T1). Both steps S1, S2 of the first reel-to-reel process are performed in a controlled atmosphere, which in the illustrative embodiments is a forming gas (i.e. a mixture of hydrogen, $H_2$, and nitrogen, $N_2$), although other process gas mixtures are contemplated. In some illustrative embodiments, the forming gas is at least 20% $H_2$ with the balance being $N_2$. The gas atmosphere may be recirculated through the cooling shroud with a heat exchanger to enhance the quench rate. The aluminum alloy strip 11 after anneal and quenching is taken up on a take-up reel to form annealed aluminum alloy coil $10_A$.

With reference to FIGS. 2B and 2C, rather than employing the cooling shroud 14, other approaches can be used to implement the quenching at a controlled temperature T2. FIG. 2B illustrates an alternative embodiment employing a float furnace 14b with forced air in place of the cooling shroud 14. In this design, forming gas ($H_2/N_2$) flow 15b floats the strip with forced air as it passes through the quench. The forced cool gas 15b flowing through the float furnace 14b of the tube furnace provides the quenching. It will be noted that this approach can also be implemented as a single reel-to-reel process S1, S2. With reference to FIG. 2C, in another approach a water quench is employed, in which the strip passes through a water bath 14c performing the quench in place of the cooling shroud 14. Suitable manipulators such as an illustrative roller 15c disposed in the water bath 14c provide guidance of the strip. This process again may be implemented as a single reel-to-reel process S1, S2.

The quench step S2, e.g. performed using one of the illustrative processes of FIG. 2A, 2B, or 2C, is advantageously a high-throughput operation. In some embodiments, the quench rate is greater than 100° F./minute, although other quench rates are contemplated. A faster quench rate has advantages both in terms of "freezing in" the alloying elements into solution and in terms of increased manufacturing throughput.

The steps S1, S2 are performed as a single reel-to-reel process; hence, the solutionized/quenched aluminum alloy is taken up on a take-up reel to form a solutionized/quenched aluminum alloy coil (not shown). This coil is then subjected to a second reel-to-reel process in which a cold rolling reduction step S3 is performed to introduce a controlled amount of work hardening. The cold rolling reduction step S3 is optional, and is performed if higher mechanical properties are desired for the tempered base metal. The cold rolling step S3 may optionally be omitted if suitable tempered properties are achieved without it, or the cold rolling step S3 may be performed with low reduction, e.g. 10% reduction in some contemplated embodiments. In the illustrative embodiment the cold rolling reduction S3 is suitably performed in air using conventional press rolling machinery (not shown) operating at room temperature (that is, no heating is applied; some heating is however produced by the mechanical deformation during the cold rolling S3). Air ambient and room temperature parameters are convenient for the rolling reduction S3, but alternative embodiments employing a controlled atmosphere and/or an oil flooded rolling mill such as a sendzimir mill and/or heating are contemplated.

It is noted that a time interval (ti) between completing the first reel-to-reel process S1, S2 and performing the second reel-to-reel cold rolling process S3 should be kept sufficiently short to prevent excessive natural hardening of the solutionized/quenched aluminum alloy coil which may occur slowly at room temperature and may prohibit or interfere with subsequent rolling operations. In some illustrative embodiments, the time interval ti is five days, i.e. the second reel-to-reel cold rolling process S3 should be performed within five days of completion of the first reel-to-reel process S1, S2. However, the maximum value for ti can be readily optimized and may be on the order of 3 weeks for a given process line by measuring hardening of the solutionized/quenched aluminum alloy coil over time. The time interval ti is a maximum to prevent excessive natural hardening, and shorter time intervals between completing the first reel-to-reel process S1, S2 and performing the second reel-to-reel cold rolling process S3 can be used.

A final step S4 of the tempering process shown in FIG. 1 is an heat treatment process S4 (also sometimes referred to herein as an "anneal") which is performed to control the precipitation hardening. The final anneal S4 may be performed as a batch process in air, although again a controlled atmosphere such as a forming gas, argon or vacuum is alternatively contemplated. The anneal temperature T3 for the final batch anneal S4 is preferably higher than the quench temperature (T2) of the quench step S2, but lower than the solutionizing temperature T1 of the reel-to-reel anneal step S1. In an illustrative embodiment (see FIG. 3), the precipitation hardening heat treatment is performed at a temperature between 300-350° F. for a time of 12-20 hours. Final heat treatment conditions may be determined iteratively by one familiar in the art for different furnaces or hardenable aluminum alloys. It is contemplated to use lower temperatures for longer times or higher temperatures for shorter time periods. The heat treatment temperature and time preferably balances manufacturing time (cost) with process control and uniformity of properties in large coils of aluminum. The resulting high strength aluminum alloy coil 10 with a precipitation hardened temper may then be processed in a step S5, e.g. to stamp and form electrical components.

The tempering process of FIG. 1 may be applied to substantially any starting aluminum alloy coil that is desired to be tempered to produce a precipitation hardened aluminum alloy coil. For example, the starting material may be a A96061-O annealed aluminum alloy coil (typical maximum tensile strength less than 18 ksi, typical maximum yield strength less than 8 ksi, maximum elongation before ultimate failure of 25-30%). Note that the unit "ksi" equals 1000 psi, i.e. 1000 pounds-per-square-inch. Other starting material tempers or configurations are contemplated and would be known to those familiar in the art.

With reference to FIG. 3, the reel-to-reel aluminum alloy tempering process of FIG. 1 is compared with a conventional tempering process for manufacturing A96061 aluminum alloy with a T6 temper alloy in accordance with an ASTM standard procedure. The illustrative processing of FIG. 3 also included a final artificial aging process at 325° F. for 16 hours (which can be viewed as part of the hardening anneal step S4). Of particular note, the ASTM procedure uses entirely batch processing; whereas, the approach of FIG. 1 employs two successive reel-to-reel processes followed by a single final batch anneal at a relatively low temperature.

With reference to FIG. 4, material properties obtained by the reel-to-reel aluminum alloy tempering process of FIG. 1 using the parameters of FIG. 3 is compared with A96061 aluminum alloys with T4 and T6 tempers accordance with the ASTM standard. The desired high tensile and yield strengths are seen to have been obtained, with comparable elongation.

With continuing reference to FIGS. 1 and 3, as a further variant, it is contemplated that the cold rolling reduction step S3 may optionally integrally incorporate cladding of the desired electrical contact surface(s) of the electrical interconnect components. Cladding is typically performed by press rolling the clad material onto the metal base; thus, the modification merely entails aligned feeding of the clad material into the press roller concurrently with the solutionized/quenched aluminum alloy. This approach is suitable if (1) the cladding reduction pressure is at least equivalent with the cold rolling reduction pressure, and (2) the resulting cladding is robust against the final batch anneal step S4. The integral cladding, if performed, can be done as either a continuous clad over the entire surface or as a selective cladding, e.g. defining spaced apart cladding strips suitable for resistance welding, for example using roll cladding. Example clad contact materials may include other aluminum alloys, copper alloys, nickel alloys or a precious metal such as silver alloys (more generally, Sn, Ni, Al, Ag, Au or alloys thereof).

If integral cladding is not performed during the press rolling reduction step S3, then the high strength aluminum alloy coil 10 is otherwise processed to apply the desired form. This may include electrical contact surface(s) of the electrical interconnect components to the high strength aluminum alloy surface. A suitable approach is electroplating. In some embodiments, no additional processing may be desired beyond the tempering process of the aluminum alloy.

Figure 5B:
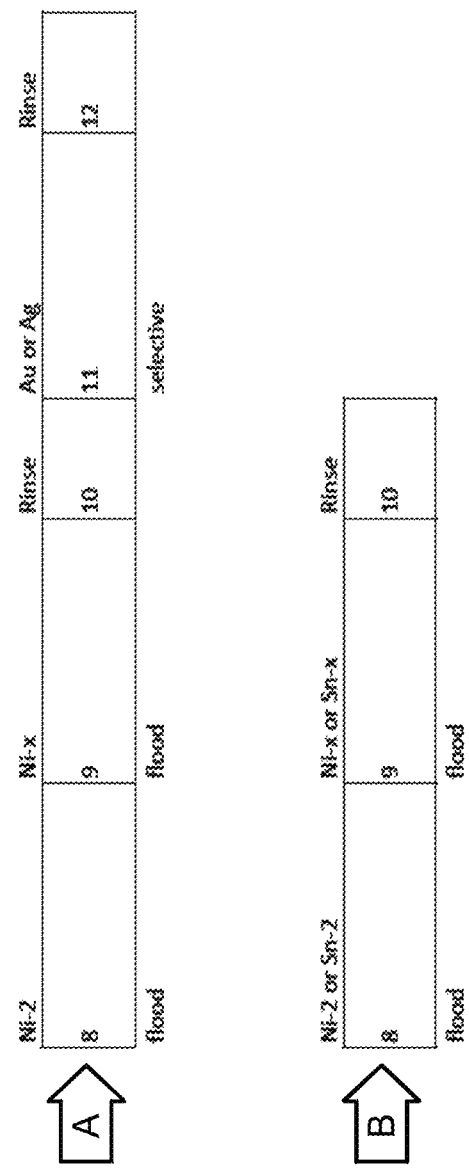

With reference to FIGS. 5A and 5B, a reel-to-reel electroplating sequence is shown. In FIGS. 5A and 5B, the "precious metal option" is suitable for electroplating a precious metal such as Au, Ag, Pd, or so forth; whereas the "non-precious metal option" is suitable for electroplating other metals such as Cu, Ni, NiP, Sn, or so forth. Both electroplating processes start with an alkaline soak clean S21 to remove organics (and/or other optional pretreatment) followed by an alkaline microetch S22, which may for example be a sodium hydroxide (NaOH) alkaline microetch S22. The step S22 is a process to prepare the surface for zincation. In a step S23, a thin (e.g. monolayer scale) zinc seed layer is formed using an electroless alkaline zincate (i.e., zincation). Thereafter, a chosen metal or metal stack (precious or non-precious) forming the contact metal is electroplated onto the zinc seed layer, e.g. using an aqueous electroplating process.

The disclosed reel-to-reel aluminum alloy electroplating process of FIGS. 5A and 5B is advantageously fast, and in some contemplated embodiments may be performed in excess of 30 feet/minute. It is to be appreciated that the electroplating process of FIGS. 5A and 5B is merely an illustrative example, and other electroplating processes are contemplated, and/or the contact metal may be disposed onto the high-strength aluminum using another process such as cladding.

An embodiment of the tempering processes disclosed with reference to FIGS. 1 and 2 can be used alone to create a high strength aluminum alloy coil (with optional cladding as described); or can be followed by an embodiment of the electroplating process disclosed with reference to FIGS. 5A and 5B.

An advantage of the combined reel-to-reel tempering and reel-to-reel electroplating processes is to enable the use of precipitation hardenable aluminum alloys for electrical interconnect components. Use of high strength aluminum alloys as the base metal for such electrical interconnect components facilitates manufacture of low cost connectors with high manufacturing throughput via fast reel-to-reel processes.

Figure 6:
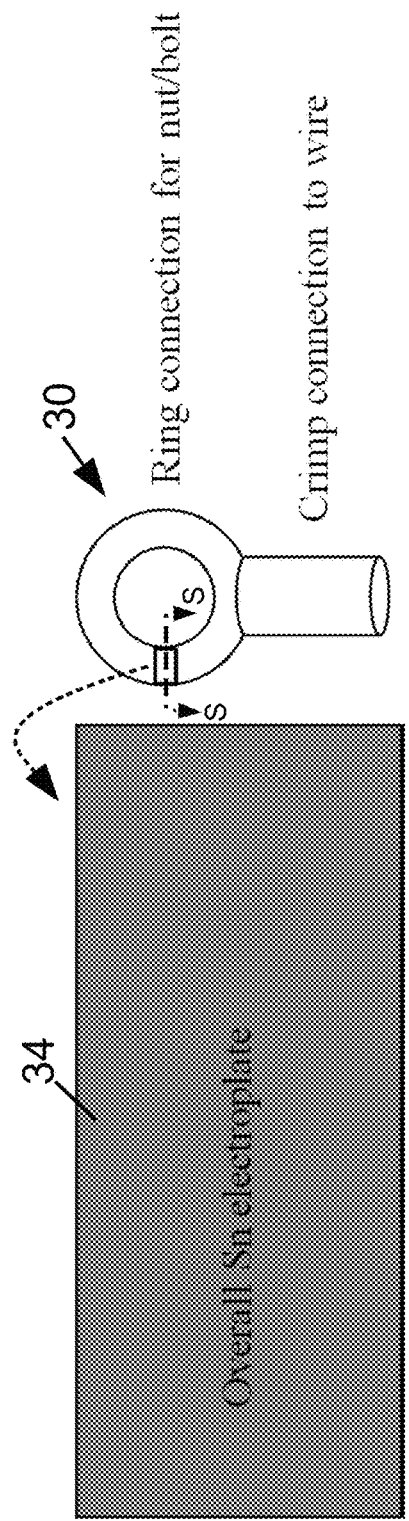
FIG. 6 diagrammatically shows a connector suitably fabricated from electroplated high-strength aluminum produced by the process of FIG. 1.
Figure 7:
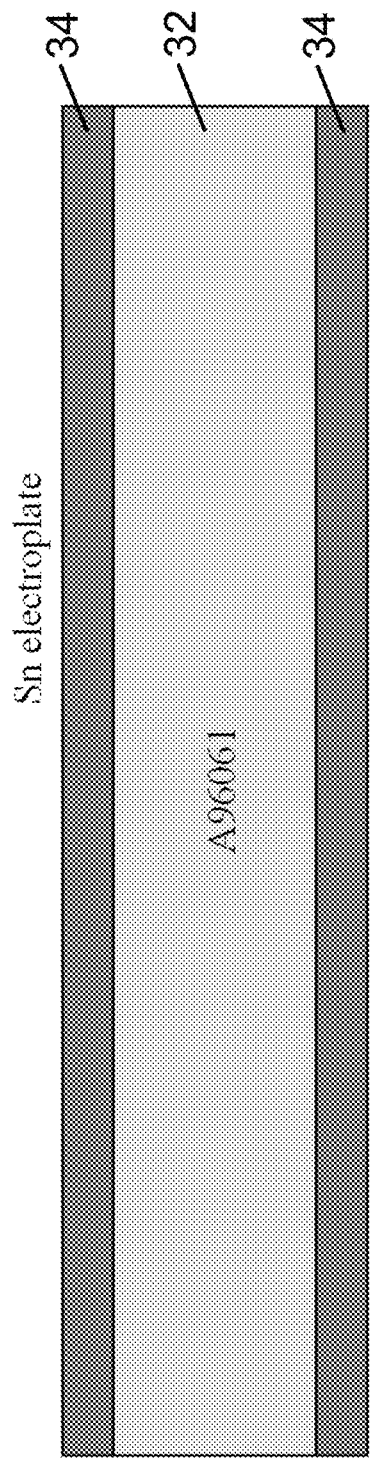
FIG. 7 diagrammatically shows a cross-section of the connector ring of the connector of FIG. 6.

With reference to FIGS. 6 and 7, such applications are illustrated by way of an illustrative contemplated ring connector 30, comprising a precipitation hardened aluminum alloy base metal 32 heat treated by the process of FIGS. 1 and 2 to obtain mechanical properties similar to T6 temper. Using the reel-to-reel electroplating process of FIGS. 5A and 5B, a tin (Sn) electroplated contact surface (or layer) 34 is plated onto both sides of the high strength aluminum alloy base metal 32. Alternatively, the plating could be over only part of the surface. The final ring connector 30 is then stamped and formed with a design specific for a desired crimp, bolt, or welded connection.

In FIG. 1, the optional cladding is performed as part of the second reel-to-reel process S3. In a variant embodiment, a separate reel-to-reel cladding process may be performed, for example preceding the first reel-to-reel process S1, S2, or after step S4 and before the stamping/forming step S5.

It will be appreciated that variations of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. A method of processing an aluminum alloy coil, the method comprising:
   a tempering process including:
   performing a first reel-to-reel process, the first reel-to-reel process comprising:
     rolling the aluminum alloy off a first feed reel, annealing the aluminum alloy to solutionize the aluminum alloy, quenching the aluminum alloy, and passing the aluminum alloy to a take up reel to form an annealed aluminum alloy coil;
   performing a second reel-to-reel process comprising rolling reduction and roll cladding a contact metal onto the aluminum alloy to form a cladded aluminum alloy coil; and
   performing a precipitation hardening heat treatment on the cladded aluminum alloy coil, wherein the cladded aluminum alloy coil has a tensile strength of greater than 42 ksi and yield strength of greater than 35 ksi; and
   performing a third reel-to-reel process comprising electroplating a contact metal on the cladded aluminum alloy coil formed by the tempering process.

2. The method of claim 1 wherein the aluminum alloy coil comprises a 2xxx, 6xxx or 7xxx series aluminum alloy.

3. The method of claim 1 wherein the first reel-to-reel process is performed in a forming gas comprising a mixture of at least 20% hydrogen and a balance of nitrogen.

4. The method of claim 3 wherein the first reel-to-reel process is performed in a strand or tube furnace having a first section heating the aluminum alloy to perform the anneal and a second section including a cooling shroud, forced air, or water bath to perform the quench.

5. The method of claim 1 wherein the first reel-to-reel process is performed in a strand or tube furnace having a first section heating the aluminum alloy to perform the solutionizing anneal and a second section including a cooling shroud, forced air, or water bath to perform the quench.

6. The method of claim 1 wherein the precipitation hardening heat treatment is performed as a batch process on the cladded aluminum alloy coil.

7. The method of claim 1 wherein the contact metal is one of Sn, Ni, Al, Ag, Au or alloys thereof.

8. The method of claim 1 wherein the roll cladding is performed during the rolling reduction.

9. The method of claim 1 wherein the third reel-to-reel process is a single reel-to-reel process including:
   performing an alkaline soak clean to remove organics;
   performing an alkaline microetch;
   forming a zinc seed layer by zincation; and
   performing aqueous electroplating of the contact metal including one or more of Ni, Sn, Ag, Au, NiP or NiPd onto the zinc seed layer.

10. The method of claim 1 further comprising:
   after performing the tempering and reel-to-reel electroplating processes, stamping electrical interconnect components from the tempered and electroplated aluminum alloy coil.

11. The method of claim 10 wherein the electrical interconnect components are connectors, lead frames, or bus bars.

* * * * *